Dec. 31, 1946.  C. PATTERSON  2,413,467

ADJUSTABLE PARALLEL BEAM CULTIVATOR

Filed Oct. 20, 1944  2 Sheets-Sheet 1

Inventor

CLARENCE PATTERSON,

By Clarence A. O'Brien
and Harvey B. Jacobson
Attorneys

Dec. 31, 1946. C. PATTERSON 2,413,467
ADJUSTABLE PARALLEL BEAM CULTIVATOR
Filed Oct. 20, 1944 2 Sheets-Sheet 2

Inventor
CLARENCE PATTERSON,
By Clarence A. O'Brien
and Harvey B. Jacobson
Attorneys

UNITED STATES PATENT OFFICE 2,413,467

ADJUSTABLE PARALLEL BEAM CULTIVATOR

Clarence Patterson, Cullman, Ala.

Application October 20, 1944, Serial No. 559,520

2 Claims. (Cl. 97—47)

This invention relates to a cultivator, and more particularly to such a cultivator adapted to be attached to a tractor the like.

A primary object of this invention is to the provision of an improved cultivator adapted to be supported by a conventional wheeled tractor at an intermediate point, and having means whereby the same may be readily raised and lowered by the tractor operator.

An additional object of this invention is the provision of a support for such a cultivator, whereby the arrangement may be varied in such manner that the cultivator can be supported in varying positions with respect to the tractor.

Still another object is the provision of means whereby the angle of the teeth of the cultivator may be readily varied with respect to the tractor body.

Still another object is the provision of such a cultivator which is sturdy and durable in construction, reliable and efficient in operation, and relatively simple and inexpensive to manufacture and install.

Other objects reside in the combinations of elements, arrangements of parts, and features of construction, all as will be more fully pointed out hereinafter and shown in the accompanying drawings, wherein there is disclosed a preferred embodiment of this inventive concept.

In the drawings.

Like numerals refer to like parts throughout the several views of the drawings.

Figure 1:
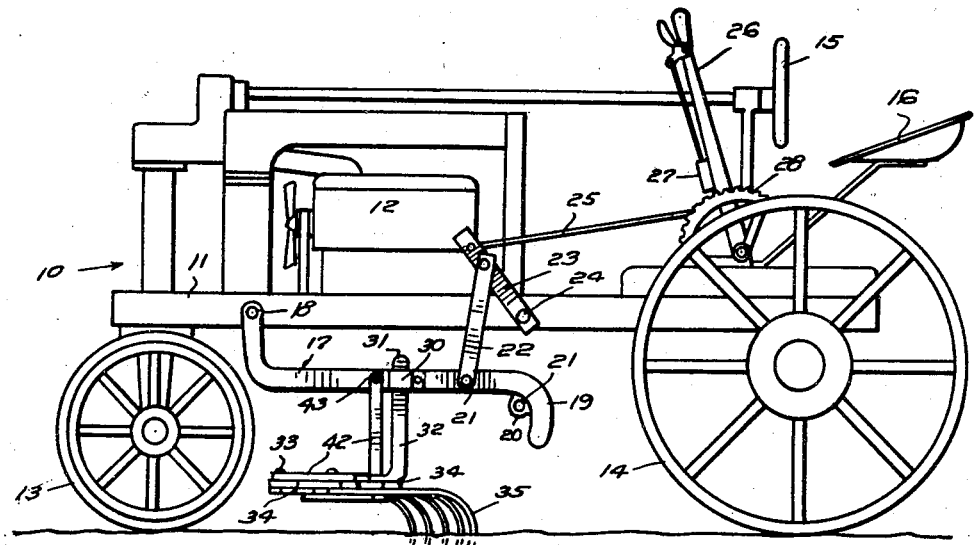
Figure 1 is a side elevational view of one form of cultivator embodying the instant invention shown as attached to a tractor.
Figure 2:
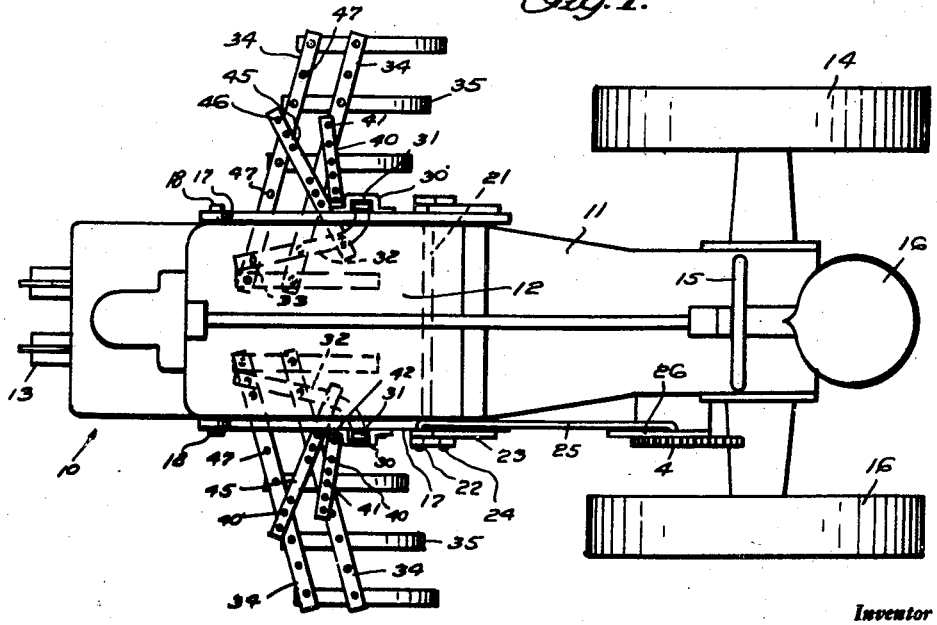
Figure 2 is a top plan view of the device shown in Figure 1, certain concealed parts thereof being indicated by dotted lines.
Figure 3:
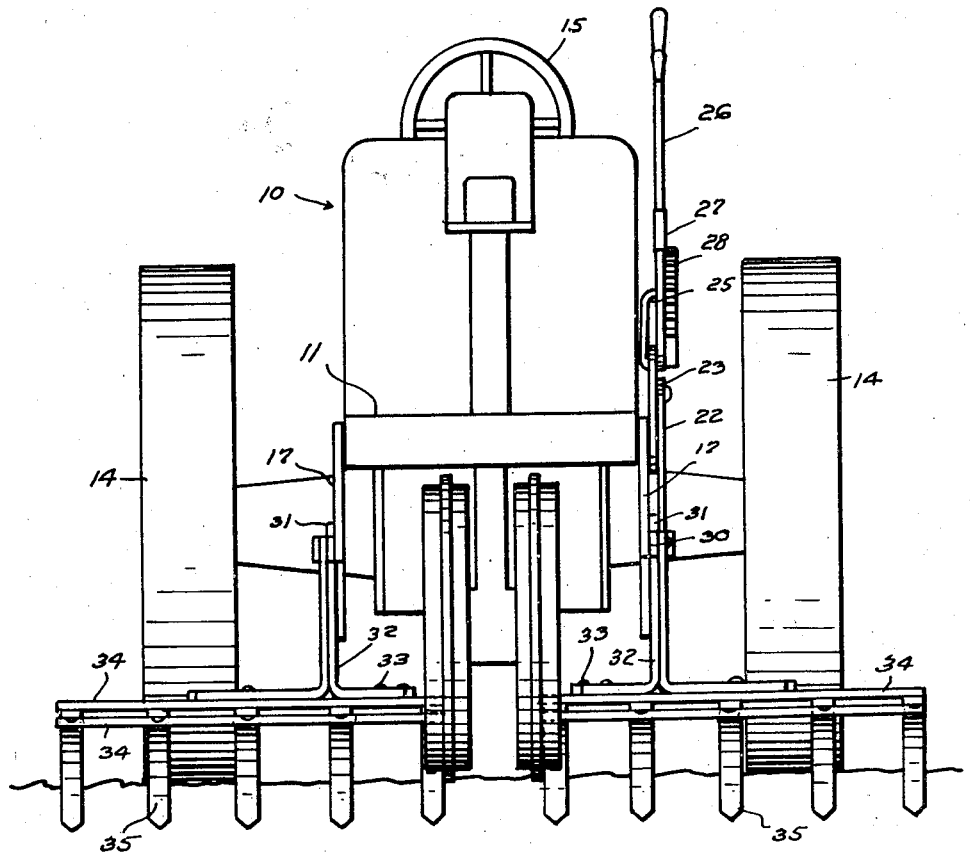
Figure 3 is an enlarged rear elevational view of the device shown in Figures 1 and 2, as applied to a tractor.
Figure 4:
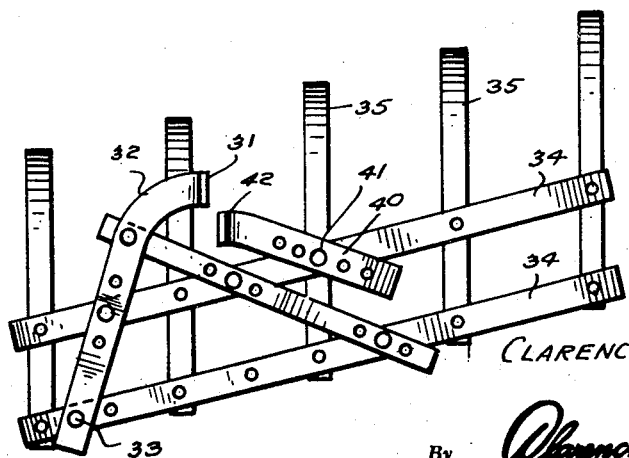
Figure 4 is an enlarged fragmentary plan view showing certain constructional details.

In the drawings there is generally indicated at 10 a conventional tractor, provided with a frame 11 having a motor 12 thereon, front wheels 13 and rear driving wheels 14, steering mechanism 15, an operator's seat 16, and other conventional control mechanism (not shown).

Pivotally secured to opposite sides of the base of frame 11 are two lever members 17, their extremities being secured to pivots 18 set in the frame. The opposite ends of members 17 terminate in downwardly extending portions 19 provided with lugs 20 having apertures therethrough, for a purpose to be more fully described hereinafter, and are connected, as by a rod 21, at an intermediate point. Secured to one of levers 17 and pivoted on rod 21 is a link 22 having its upper extremity secured to a lever 23 pivoted, as on a pin 24, to frame 11. Secured to the upper end of lever 23 is a rod 25, the opposite end of which is secured to an operating handle 26 having associated therewith a conventional spring-pressed detent 27 adapted to engage a keeper 28.

It will now be seen that movement of the lever or handle 26 serves, through the connection just described, to effectively raise and lower lever member 17 about its pivot 18, for a purpose to be more fully described hereinafter.

Each of members 17 is provided at an intermediate point with a channel 30, into which are adapted to extend the upwardly extending extremities 31 of supporting members 32 each having horizontally bent portions, engaged, as by bolts 33, to supports comprising transversely extending parallel members 34 on opposite sides of the tractor frame. Each pair of members 34 has secured thereto a plurality of teeth 35, which serve, when the device is lowered in the manner previously described by adjustment of handle 26, to furrow the ground.

Adjustable lock braces 40, each having a plurality of apertures 41 therein, and each being comprised of a horizontal portion and a vertically extending portion 42, are adapted to be secured to members 34 adjustably in accordance with the position of said members, and have their vertically extending portions secured, as by bolts 43, to lever members 17.

Diagonally disposed adjusting braces 45, each provided with a plurality of holes 46 therein, are adapted to extend from the transverse horizontal portions of members 32 and be secured in selected apertures 47 in members 34, the angle of the members 34 with respect to the tractor 11 being thus varied to vary the angle of the teeth 35 in accordance with the apertures selected in the members 45 and 34.

From the foregoing, it will now be seen that there is herein provided a cultivator accomplishing all the objects of this invention and others, including many advantages of great practical utility and commercial importance.

As many embodiments may be made of this inventive concept, and as many modifications may be made of the embodiment hereinbefore shown and described, it is to be understood that all matter herein is to be interpreted merely as illustrative and not in a limiting sense.

I claim:

1. In combination with a tractor frame, of a cultivator attachment supported thereby comprising a pair of S-shaped levers pivoted to said tractor frame at their forward ends, means connected between the rear ends of said levers, depending L-shaped supporting brackets secured to said levers, spaced parallel bars adjustably supported by said brackets, parallel cultivator teeth secured to said bars, interconnected links adjustably connected between said bars, guide channels secured to said levers, said links having upwardly directed guide extensions slidably received in said guide channels, and means for raising and lowering said levers and cultivator teeth supported thereby.

2. In combination with a tractor frame, of a cultivator attachment supported thereby comprising a pair of S-shaped levers pivoted to said tractor frame at their forward ends, means connected between the rear ends of said levers, depending L-shaped supporting brackets secured to said levers, spaced parallel bars adjustably supported by said brackets, parallel cultivator teeth secured to said bars, means for varying the angular relation of said parallel bars and hence the teeth with respect to said levers comprising interconnected links adjustably connected between said bars, guide channels secured to said levers, said links having upwardly directed guide extensions slibably received in said guide channels, means for raising and lowering said levers including a link secured to one of said levers, a link pivotally connected to said tractor frame and to said first-mentioned link, a control rod pivoted to the outer end of said last-mentioned link, and a handle for operating said control rod.

CLARENCE PATTERSON.